United States Patent

Page et al.

Patent Number: 5,299,417
Date of Patent: Apr. 5, 1994

[54] APPARATUS FOR TRIMMING AUTOPILOT COMMANDS

[75] Inventors: George W. Page, Gilbert; Glen T. High; Larry C. Prevallet, both of Phoenix; Joseph W. Free, Mesa, all of Ariz.

[73] Assignee: Allied-Signal Inc., Morris Township, Morris County, N.J.

[21] Appl. No.: 762,678

[22] Filed: Sep. 18, 1991

[51] Int. Cl.$^5$ ............................................. F02C 9/28
[52] U.S. Cl. .................................... 60/39.282; 416/27
[58] Field of Search ................ 60/39.282; 416/27, 30, 416/35; 364/431.02, 433, 434, 435

[56] References Cited

U.S. PATENT DOCUMENTS

| | | |
|---|---|---|
| 4,594,852 | 6/1986 | Snow et al. |
| 4,625,510 | 12/1986 | Evans ................. 60/39.282 |
| 4,644,744 | 2/1987 | Mittendorf et al. ............... 60/39.282 |
| 4,648,797 | 3/1987 | Martin .................................. 416/27 |
| 4,693,077 | 4/1987 | Skarvan et al. ................... 60/39.282 |
| 4,947,164 | 8/1990 | Bateman . |

FOREIGN PATENT DOCUMENTS

0431655A2 6/1991 European Pat. Off. .
0431655A3 6/1991 European Pat. Off. .

Primary Examiner—Louis J. Casaregola
Attorney, Agent, or Firm—Hugh P. Gortler; James W. McFarland; Robert A. M. Walsh

[57] ABSTRACT

An aircraft is maintained at a constant glide slope and air speed by trimming delta torque commands provided by an autopilot. Delta torque commands that change by more than twenty percent are trimmed automatically to maintain the constant glide angle and to assist the pilot in maintaining air speed within ±5 knots on the approach glide slope.

16 Claims, 2 Drawing Sheets

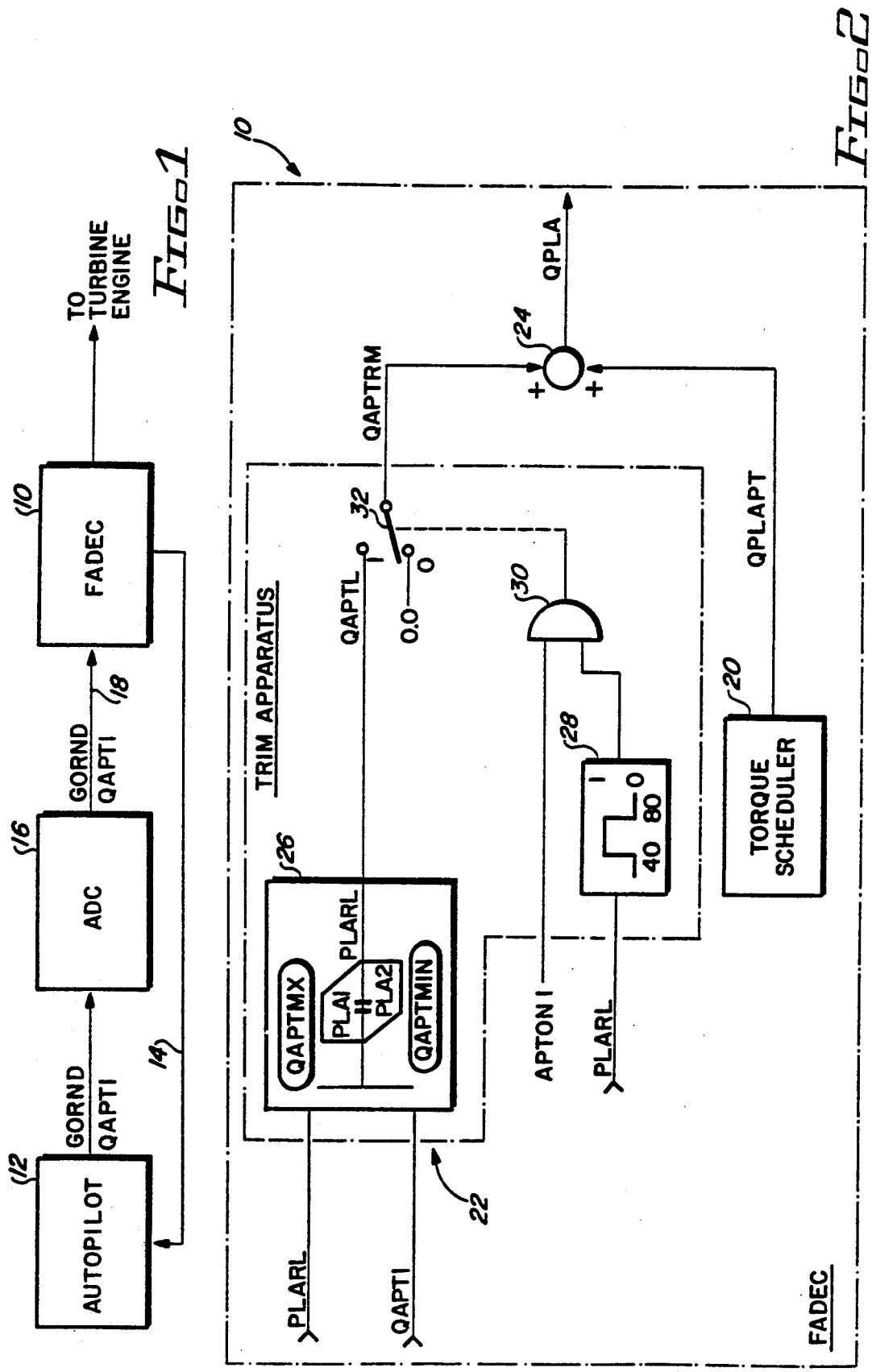

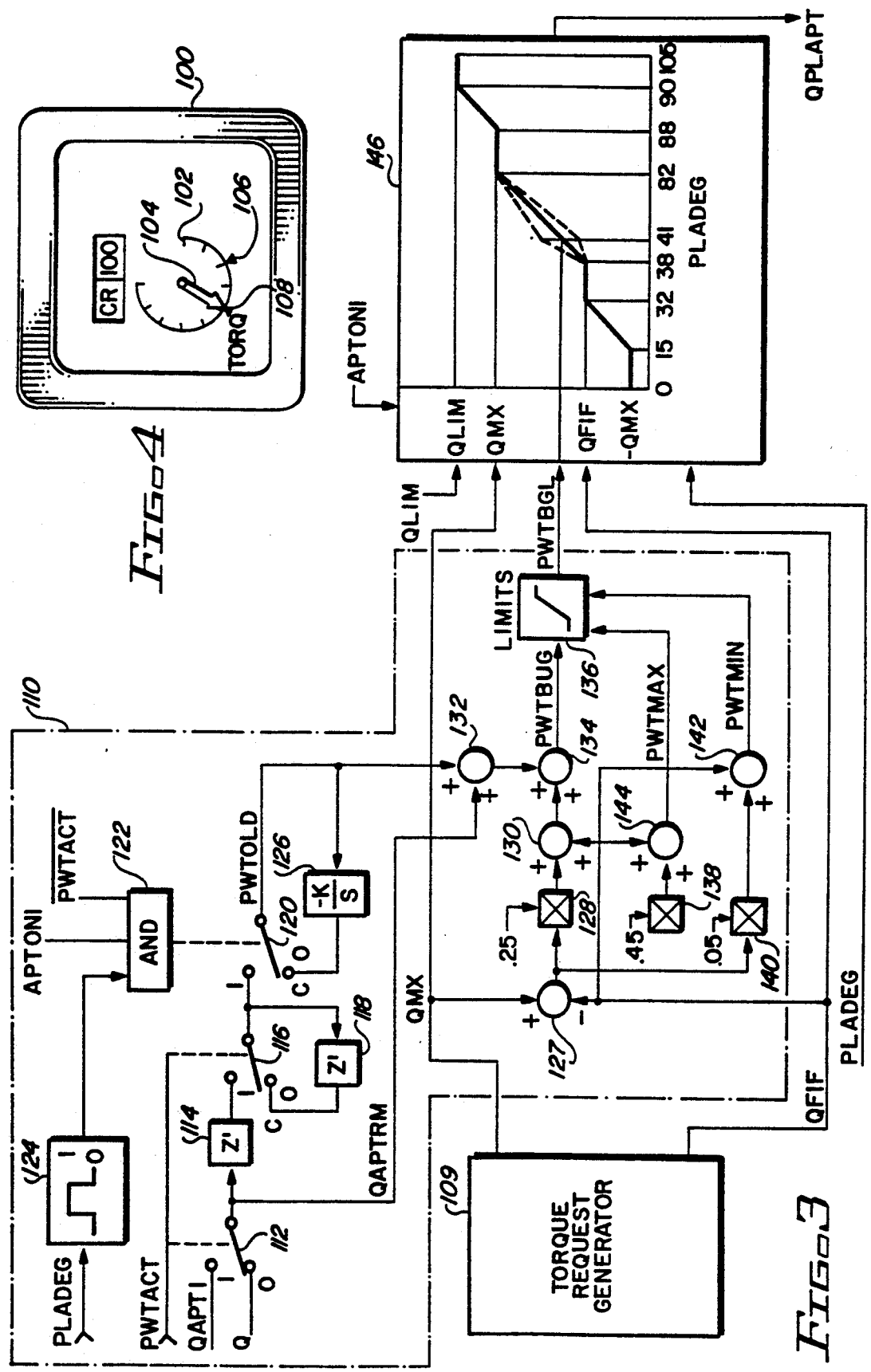

APPARATUS FOR TRIMMING AUTOPILOT COMMANDS

FIELD OF THE INVENTION

The present invention relates in general to power management systems for turbine engines and in particular to apparatus for trimming autopilot commands.

BACKGROUND OF THE INVENTION

An aircraft typically follows a constant glide slope as it approaches an airport. The aircraft is equipped with autopilots, which provide delta torque commands that adjust the engine torques of corresponding engines to keep the aircraft on a constant glide slope. However, the engine torques are changed without regard to resulting changes in airspeed. Thus, the aircraft can undergo large fluctuations in airspeed during approach.

To maintain both constant glide slope and air speed, a pilot must continually adjust engine power. This entails significant pilot workload.

SUMMARY OF THE INVENTION

During approach, the aircraft is automatically maintained at a constant glide slope and air speed by trimming apparatus. In one embodiment of the present invention, the trimming apparatus trims the delta torque commands between upper and lower limits. The trimmed delta torque commands are utilized to adjust engine torque.

In another embodiment of the present invention, the trimming apparatus is employed with means for generating torque requests. The trimming apparatus calculates a setpoint torque request corresponding to a first power lever angle. At the first power angle, the trimming apparatus adds the delta torque commands to the setpoint torque requests and limits the sums between upper and lower limits. The upper limit is a first value, such as 20%, above the setpoint torque request, and the lower limit is a second value, such as −20% below the setpoint torque request.

In both embodiments, the trimming apparatus automatically prevents large changes in commanded engine torque. When the trimming means is applied to aircraft engines, pilot workload is reduced.

BRIEF DESCRIPTION OF THE DRAWINGS

FIG. 1 is a block diagram of the avionics architecture for a power management system including a FADEC;

FIG. 2 is a logic diagram of apparatus for trimming autopilot commands according to one embodiment of the present invention;

FIG. 3 is a logic diagram of apparatus for trimming autopilot commands according to a second embodiment of the present invention; and FIG. 4 is a schematic diagram of an EICAS which displays the torques generated by the apparatus depicted in FIG. 3.

DETAILED DESCRIPTION OF THE PREFERRED EMBODIMENT

FIG. 1 shows a power management system that issues fuel flow commands to a turbine engine. The power management system includes a full authority digital engine control (FADEC) 10. Disclosed in applicants' copending application No. 07/762,322 filed concurrently herewith and entitled "POWER MANAGEMENT SYSTEM FOR TURBINE ENGINES" (hereinafter referred to as "Applicants' Power Management System") is a FADEC including a torque scheduler that generates torque commands as a function of power lever angle. This application is incorporated herein by reference. Although the present invention can be employed in any digital engine control that generates torque commands, it is especially suitable for the FADEC of Applicants' Power Management System. Accordingly, the present invention will be described in connection with such a FADEC.

An autopilot 12 calculates a delta torque command QAPT1 that adjusts the engine torque to maintain the aircraft on a constant glide slope. The autopilot 12 also issues a go around command GORND, which instructs the FADEC 10 to disengage from the autopilot 12. The FADEC 10 outputs an interlock signal APTON1 to the autopilot 12 over conductor 14. The interlock signal APTON1 is a discrete signal that enables/disables the autopilot 12. The autopilot 12 can be a Collins APC-65G autopilot.

An air data computer (ADC) 16 receives the delta torque and go around commands QAPT1 and GORND from the autopliot 12. The ADC 16 provides the delta torque and go around commands QAPT1 and GORND to the FADEC 10 over a second data bus 18, which can be an ARINC-429 data bus. Although other types of data buses can be employed, the ARINC-429 data bus is an industry standard that is defined by commercial airlines. The ADC 16 can be a Collins ADC-86.

Referring now to FIG. 2, the FADEC 10 includes a torque schedule 20 which issues a torque command QPLAPT. For power lever angles between thirty five and eighty five degrees, torque commands QPLAPT are linearly interpolated between torques for flight idle and flight.

Trim apparatus 22 functions to trim the delta torque commands QAPT1 to keep the aircraft at a constant air speed during approach. The delta torque command QAPT1 is limited to upper and lower limits QAPTMX and QAPTMN. An output of the trim appartus 22 provides a trimmed delta torque command QAPTRM.

A first adder 24 adds the torque command QPLAPT to the trimmed delta torque command QAPTRM. An output of the first adder 24 provides an adjusted torque command QPLA, which maintains the aircraft on its glide slope at a constant air speed.

Still referring to FIG. 2, the trim apparatus 22 includes a function generator 26 which receives the delta torque command QAPT1. For an aircraft having multiple engines, an average of the delta torque commands from all of the autopilots is taken, and the average delta torque command is supplied to the function generator 26. The function generator 26 limits the delta torque command QAPT1 to the upper and lower limits QAPTMX and QAPTMN, which ensure that the delta torque command QAPT1 does not change the engine torque by more than a value such as twenty percent. This value reflects the amount of power required under normal wind shear conditions. Further, the upper and lower limits QAPTMX and QAPTMN are adjusted to ensure that the adjusted torque command QPLA remains within a bandwidth defined by the flight idle and flight torques.

The lower limit QAPTMN represents the minimum trimmed delta torque command QAPTRM that can be added to the torque command QPLAPT. When the power lever angle PLARL is at or above forty five degrees, the corresponding torque command QPLAPT is twenty percent or more above the flight idle torque. Therefore, the most that can be subtracted from the torque command QPLAPT is twenty percent. When the power lever angle is between thirty-five and forty five degrees, the most that can be subtracted from the torque command QPLAPT is limited between zero and twenty percent, provided that the adjusted torque command QPLA remains above the flight idle torque. For a power lever angle of thirty five degrees, nothing can be subtracted from the torque command QPLAPT, but as much as twenty percent can be added thereto.

The upper limit QAPTMX represents the maximum trimmed delta command torque QAPTRM that can be added to the torque command QPLAPT. When the power lever angle PLARL is at or below seventy five degrees, the most that can be added to the torque command QPLAPT is twenty percent. And, when the power lever angle PLARL is between eighty five and seventy five degrees, the most that can be added to the torque command QPLAPT is between zero and twenty percent, provided that the adjusted torque command QPLA remains below the flight torque. At a power lever angle PLARL of eighty five degrees, nothing can be added to the torque command QPLAPT, but as much as twenty percent can be subtracted therefrom.

The trimmed torque command QAPTRM is added to the torque command QPLAPT only when the following conditions are satisfied: the autopilot 12 is enabled (interlock signal APTON1 goes high) and the power lever angle PLARL is between forty and eighty degrees (an output of a third function block 28 goes high). An AND gate 30, whose respective inputs are supplied with interlock signal APTON1 and an output of the second function block 28, goes high when these conditions are satisfied. A switch 32 couples the function generator 26 to a first input of the adder 24 when the output of the AND gate 30 goes high (i.e., the trim apparatus 22 is enabled). Thus, the first adder 24 adds the trimmed delta torque command QAPTRM to the torque command QPLAPT. When the output of the AND gate 30 goes low (i.e., the trim apparatus 22 is disabled), the switch 32 supplies the value zero to the first input of the first adder 24. Thus, the torque command QPLAPT is not adjusted at all.

During operation, the pilot sets the autopilot approach reference speed, enables the autopilot 12 and moves the power lever angle between forty and eighty degrees. The autopilot 12 continually updates the delta torque commands QAPT1 as required to maintain the aircraft on the glide slope. The trim apparatus 22 trims the delta torque command QAPT1 to keep the aircraft at a constant air speed. The trimmed delta torque command QAPTRM is added to the torque command QPLAPT, and the resulting adjusted torque command QPLA is supplied to the turbine engine. To disable the autopilot 12, the pilot issues the go around command GORND to the FADEC 10. In response, the FADEC 10 sets the interlock signal APTON1 to a low level. Alternately, the pilot can move the power lever angle below forty degrees or above eighty degrees.

In FIG. 2, the trim apparatus 22 is shown as a part of the FADEC 10. Because the FADEC 10 is essentially a microprocessor, the trim apparatus 22 is most conveniently realized in software. Still, the trim apparatus 22 can be realized in hardware and used in conjunction with the FADEC 10 or any other digital engine control.

FIGS. 3 and 4 refer to a second embodiment of the present invention. In FIG. 4, an Engine Indication and Crew Alerting System (EICAS) 100 includes a torque gauge 102 having a torque indicator 104, which displays actual engine torque, a PWT bug 106, which displays a power trim torque command PWTBUG, and a torque request bug 108, which displays the torque command QPLAPT.

During approach, power trim apparatus is enabled from the cockpit via an autopilot switch (not shown). The pilot adjusts the power lever until the torque request bug 108 and the torque indicator 104 are aligned with the PWT bug 106. This represents a power lever angle of 49 ±1 degrees. Upon alignment, a signal PWTACT is issued, whereupon the power trim apparatus calculates a power trim torque command PWTBUG and trims the delta torque command QAPT1 within upper and lower limits (e.g., ±20%). The power trim torque command PWTBUG is sent to the EICAS 100 for display by the PWT bug 106.

Reference is now made to FIG. 3. A torque request generator 109, which forms a part of Applicants' Power Management System, generates flight and flight idle torque commands QMX and QFIF. The flight torque command QMX is issued when power lever angle is between eighty two and eighty eight degrees, and the flight idle torque command QFIF is issued when the power lever angle is between thirty two and thirty eight degrees.

The flight and flight idle torque commands QFIF and QMX are supplied to power trim apparatus 110. The trim apparatus 110 includes a first switch 112 whose inputs are supplied with delta torque commands QAPT1 and a constant 0.0, respectively. The first switch 112, which is responsive to the signal PWTACT, selects the delta torque command QAPT1 when the signal PWTACT is issued. Otherwise, the value 0.0 is selected. One output of the first switch 112 provides the delta torque command QAPTRM.

The trim apparatus 110 also provides an old delta torque command PWTOLD, which is the delta torque command when the torque indicator 104 and torque request bug 108 are last aligned with the PWT bug 106. The trim apparatus 110 outputs either the old delta torque command PWTOLD or the delta torque command QAPTRM, but never both at the same time. The torque command QAPTRM provided by the first switch 112 is stored in a first delay element 114. An output of the first delay element 114 is coupled to a first input of a second switch 116, which is also responsive to the signal PWTACT. A second delay element 118 is coupled between an output of the second switch 116 and a second input of the second switch 116. When the signal PWTACT is issued, the second switch 116 selects the output of the first delay element 114, i.e. the delta torque command QAPTRM. Thus, the delta torque command QAPTRM is also stored in the second delay element 118 when the torque indicator 104 and torque request bug 108 are aligned with the PWT bug 106. Otherwise, the constant 0.0 is stored in the first and second delay elements 114 and 118.

The output of the second switch 116 is coupled to one input of a third switch 120, which is responsive to the output of an AND gate 122. The output of the AND gate 122 goes high when the signal PWTACT goes low, the autopilot interlock signal APTON1 goes high and the power lever angle PLADEG is between forty and eighty degrees (i.e., an output of a function block 124 goes high).

Thus, when power lever angle PLADEG is set at 49 ±1 degrees, the trim apparatus 110 outputs the delta torque command QAPT1 as the torque command QAPTRM and stores the delta torque command QAPT1 in the first and second delay elements 114 and 118. When the power lever angle PLADEG is moved away from 49 degrees, but remains within the range of 40 to 80 degrees, the output of the second delay element 114 provides the old delta torque command PWTOLD and the delta torque command QAPTRM goes to zero. When the power lever angle PLADEG is moved above 80 degrees or below forty degrees, an integrator 126 causes the the old power trim torque PWTOLD to decay slowly to zero. The rate of decay is determined by a constant $-K$, which can have a value of 5%/sec. In the meantime, the delta torque command QAPTRM remains at zero.

The power trim torque command PWTBUG is determined by equation $$PWTBUG = 0.25(QMX - QFIF) + QFIF + PWTOLD + QAPTRM$$

A first subtracter 127 takes the difference of the flight and flight idle torque commands QMX and QFIF to provide a difference signal DQ. A first multiplier 128 multiplies the difference signal DQ by a constants 0.25, and a first adder 130 adds the flight idle torque QFIF to the output signal provided by the first multiplier 128. The output of the first adder 130 provides the torque at a power lever angle PLADEG of forty-nine degrees, i.e., roughly one-quarter the distance between the flight idle and power set positions. A second adder 132 takes the sum of the delta torque command QAPTRM and the old delta torque command PWTOLD. A third adder 134 adds together the output signals of the first and second adders 130 and 132. An output of the third adder 134 provides the power trim torque command PWTBUG.

An authority limiter 136 limits the power trim torque command PWTBUG between upper and lower limits PWTMAX and PWTMIN to provide a limited power trim torque command PWTBUGL. The upper and lower limits PWTMAX and PWTMIN of the authority limiter 136 are determined by the equations $$PWTMAX = 0.45(QMX - QFIF) + QFIF$$

$$PWTMIN = 0.05(QMX - QFIF) + QFIF$$

respectively. Second and third multipliers 138 and 140 multiply the difference signal DQ by constants 0.45 and 0.05 respectively. A fourth adder 142 adds the flight idle torque command QFIF to the output signal provided by the third multiplier 140. The output of the fourth adder 142 provides the lower limit PWTMIN. Thus, the power trim torque command PWTBUG can decrease by as much as twenty percent, provided that it does not go below flight idle torque QFIF. A fifth adder 144 adds the flight idle torque command QFIF to the output signal provided by the second multiplier 138. The output of the fifth adder 144 provides the upper limit PWTMAX. Thus, the power trim torque command PWTBUG can be increased by as much as twenty percent, provided that it does not go above the flight torque command QMX. An output of the authority limiter 136 provides a limited power trim torque command PWTBGL.

A function generator 146, which forms a part of Applicants' Power Management System, receives the following inputs: flight torque command QMX, flight idle torque command QFIF, torque command QLIM indicating a maximum torque, power lever angle PLADEG, interlock signal APTON1 and the limited power trim torque command PWTBGL.

The torque command PWTBGL is not utilized by the function generator 146 until the interlock signal APTON1 is issued. Once the interlock signal APTON1 is issued, the PWT bug 106 displays the torque command PWTBUG at a power lever angle PLADEG of forty nine degrees. Once the PWT bug 106 is aligned with the torque indicator 104 and torque request bug 108, the signal PWTACT goes high and the delta torque commanded QAPTRM is added to the power trim torque command PWTBUG. As a result, the commanded torque QPLAPT changes between the flight torque command QMX and the flight idle torque command QFIF within the limits PWTMIN and PWTMAX while the power lever angle PLADEG remains at forty nine degrees. In this manner, the autopilot 12 adjusts the torque command QPLAPT to keep the aircraft on the glide slope and the trim apparatus 110 adjust the delta torque command QAPT1 to keep the aircraft at a constant air speed.

The function generator 146 starts interpolating between three regions. The first region is between a flight idle torque and a torque corresponding to a power lever angle PLADEG of thirty eight degrees; the second region is between the power trim torque command PWTBUG and a torque corresponding to a power lever angle of forty nine degrees; and the third region is between flight torque and a torque corresponding to a power lever angle of eighty two degrees.

Say now that the torque command QPLAPT is above slope S4 of the function generator 146 and the power lever angle is advanced towards the power set position. The command torque QPLAPT corresponding to a power lever angle PLADEG of forty nine degrees is saved as the old power trim torque PWTOLD and the function generator 146 interpolates a new torque command QPLAPT along line I1, i.e., it interpolates a torque between the old power trim torque PWTOLD and the flight torque command QMX. Once the power lever angle is set at eighty five degrees, the old power trim torque PWTOLD decays to zero. Without the interpolation and decay, the commanded torque QPLAPT would jump from the old power trim torque PWTOLD to the torque on the slope S4. Thus, large transitions in torque commands QPLAPT are avoided. Interpolation along line I2 occurs. Interpolation along line I4 also occurs when the old power trim torque PWTOLD is above the slope S4 and the power lever angle is moved towards the flight idle position.

Thus disclosed is apparatus that allows for limited torque trim, that allows for torque reduction at high power levels and that allows for increases in torque at low power levels. Further, the apparatus provides recovery to non-trimming operations based upon power lever angle.

It will be understood that the embodiments described herein are merely exemplary and that a person skilled in the art may make many variations and modifications without departing from the spirit and scope of the invention. All such modifications are intended to be included within the scope of the invention as defined in the appended claims.

What is claimed is

1. Apparatus for providing torque commands to at least one engine of an aircraft, comprising:
 engine control means for generating torque requests for said engines;
 autopilot means for generating delta torque commands for adjusting said torque requests; and
 trimming means, responsive to outputs of said engine control means and said autopilot means, for trimming said delta torque commands to keep said aircraft within a range of airspeeds.

2. Apparatus according to claim 1, wherein said trimming means includes:
 limiting means, responsive to outputs of said autopilot means, for limiting said delta torque commands between upper and lower limits, an output of said limiting means providing trimmed delta torque commands; and
 adding means, responsive to outputs of said engine control means and said limiting means, for adding said trimmed delta torque commands to said torque requests, an output of said adding means providing said torque commands.

3. Apparatus according to claim 2, wherein said engine control means interpolates torque requests between an upper torque and a lower torque, wherein said limiting means calculates said upper limit such that the sums of said trimmed delta torque commands and said torque requests do not exceed said upper torque, and wherein said limiting means calculates said lower limit such that the sums of said trimmed delta torque commands and said torque requests do not fall below said lower torque.

4. Apparatus according to claim 3, wherein said trimming means further includes enabling means, responsive to power lever angle and to an autopilot "on" signal, for enabling said limiting means to output said trimmed delta torque commands.

5. Apparatus according to claim 2, wherein said autopilot means includes at least two autopilots, each said autopilot providing delta torque commands; and wherein said trimming means further includes averaging means, responsive to said autopilots, for taking averages of said of said delta torque commands, an output of said averaging means providing average delta torque commands to said limiting means.

6. Apparatus according to claim 2, wherein said upper limit value is 20% and wherein said lower limit is −20%.

7. Apparatus according to claim 1, wherein said trimming means includes:
 setpoint means, responsive to command means, for calculating setpoint torque commands when a power lever angle is set at a first angle;
 adding means for adding said setpoint torque commands to said delta torque commands, an output of said adding means providing power trim commands;
 upper limit means, responsive to said setpoint means, for setting said upper limit at a first value above said setpoint torque command;
 lower limit means, responsive to said setpoint means, for setting said lower limit at a second value below said setpoint torque command; and
 limiting means, responsive to outputs of said adding means and said upper and lower limit means, for limiting said power trim commands between said upper and lower limits, an output of said limiting means providing said torque commands.

8. Apparatus according to claim 7, wherein said command means provides torque requests ranging between an upper torque and a lower torque, and wherein said setpoint torque commands are located between said upper and lower torques such that said torque commands remain between said upper and lower torques.

9. Apparatus according to claim 8, wherein said setpoint torque command is roughly 25% between said upper and lower torques.

10. Apparatus according to claim 9, wherein said first and second values are 20%.

11. Apparatus according to claim 8, wherein said trimming means further includes enabling means for enabling said trimming means to receive said delta torque commands when said power lever angle is between second and third angles.

12. Apparatus according to claim 11, wherein said trimming means further includes:
 saving means, responsive to said setpoint means, for saving said setpoint torque commands when said power lever angle is moved away from said first angle; and
 interpolating means, responsive to said savings means and said command means, for interpolating a torque command between a saved setpoint torque command and a torque request corresponding to a power lever angle between said second and third angles.

13. Apparatus according to claim 12, wherein said trimming means further includes decaying means for decaying said torque command when said power lever angle is outside said second and third angles.

14. Apparatus for providing engine torque commands, comprising command means for generating torque requests ranging between an upper torque and a lower torque; delta torque means for generating delta torque commands; and trimming means including:
 setpoint means, responsive to said command means, for calculating setpoint torque commands when a power lever angle is set at a first angle, said setpoint torque commands being located between said upper and lower torque requests;
 adding means for adding said setpoint torque commands to said delta torque commands, an output of said adding means providing power trim commands;
 upper limit means, responsive to said setpoint means, for setting an upper limit at a first value above said setpoint torque commands and below said upper torque;
 lower limit means, responsive to said setpoint means, for setting a lower limit at a second value below said setpoint torque commands and above said lower torque; and
 limiting means, responsive to outputs of said adding means and said upper and lower limit means, for limiting said power trim commands between said upper and lower limits, an output of said limiting means providing said torque commands.

15. Apparatus for providing torque commands to at least one engine of an aircraft, comprising:
 engine control means for generating torque requests for said engines, said torque requests being interpolated between upper and lower torques;

autopilot means for generating delta torque commands for adjusting said torque requests;

limiting means, responsive to said autopilot means, for trimming said delta torque commands between upper and lower limits, said upper limit being calculated such that the sums of said trimmed delta torque commands and said torque requests do not exceed said upper torque, said lower limit being calculated such that the sums of said trimmed delta torque commands and said torque requests do not fall below said lower torque; and adding means for adding said trimmed delta torque commands to said torque requests, an output of said adding means providing said engine torque commands, whereby said aircraft is maintained within upper and lower limits of airspeed.

16. Apparatus according to claim 15, further including enabling means, responsive to power lever angle and to an autopilot "on" signal, for enabling said limiting means to output said trimmed delta torque commands during approach.

* * * * *

UNITED STATES PATENT AND TRADEMARK OFFICE
CERTIFICATE OF CORRECTION

PATENT NO. : 5,299,417
DATED : April 5, 1994
INVENTOR(S) : George W. Page, Glen T. High, Larry C. Prevallet and Joseph W. Free It is certified that error appears in the above-identified patent and that said Letters Patent is hereby corrected as shown below:

On the cover page correct the application no. line to read:

item [21] Appl. No.: 762,670

Signed and Sealed this

Ninth Day of August, 1994

Attest:

BRUCE LEHMAN

Attesting Officer     Commissioner of Patents and Trademarks